United States Patent
Kuehner et al.

(10) Patent No.: US 12,466,396 B2
(45) Date of Patent: Nov. 11, 2025

(54) MITIGATING AN EFFECT OF A COLLISION BETWEEN A VEHICLE AND AN OBSTACLE

(71) Applicant: Woven by Toyota, Inc., Tokyo (JP)

(72) Inventors: Manuel Ludwig Kuehner, Mountain View, CA (US); Hiroshi Yasuda, San Francisco, CA (US); Julia I. Pralle, Palo Alto, CA (US)

(73) Assignee: Woven By Toyota, Inc., Tokyo (JP)

( * ) Notice: Subject to any disclaimer, the term of this patent is extended or adjusted under 35 U.S.C. 154(b) by 187 days.

(21) Appl. No.: 18/129,246

(22) Filed: Mar. 31, 2023

(65) Prior Publication Data

US 2024/0326786 A1    Oct. 3, 2024

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 40/08;
(Continued)

(56) References Cited

U.S. PATENT DOCUMENTS

| 7,016,783 B2 | 3/2006 | Hac et al. |
| 9,950,708 B1 | 4/2018 | Cullinane et al. |

(Continued)

FOREIGN PATENT DOCUMENTS

| CN | 111897356 A | 11/2020 |
| CN | 112606837 A | 4/2021 |

(Continued)

OTHER PUBLICATIONS

Unknown, "Advanced driver-assistance system," last accessed on Mar. 27, 2023, 17 pages, found at https://en.wikipedia.org/wiki/Advanced_driver-assistance_system.

(Continued)

*Primary Examiner* — Daniel M. Robert
(74) *Attorney, Agent, or Firm* — Christopher G. Darrow; DARROW MUSTAFA PC (57) ABSTRACT

A system for mitigating an effect of a collision between a vehicle and an obstacle can include a processor and a memory. The memory can store a seat occupancy determination module and a set of modules including a candidate response determination module, a candidate response evaluation module, and a controller module. The seat occupancy determination module can determine a state of a seat with respect to being occupied by a living being, the seat being on a first side opposite of a second side at which an operator is located. The set of modules can cause, in response to the state being: (1) occupied, a first set of operations to be implemented and (2) unoccupied, a second set of operations to be implemented. Each of the first set and the second set can be different from a current trajectory of the vehicle and can mitigate the effect of the collision.

20 Claims, 5 Drawing Sheets

(51) Int. Cl.
    *B60W 10/20*         (2006.01)
    *B60W 30/095*       (2012.01)
    *B60W 40/08*         (2012.01)
    *B60W 40/101*       (2012.01)
    *B60W 40/114*       (2012.01)

(52) U.S. Cl.
    CPC ........ *B60W 30/0956* (2013.01); *B60W 40/08* (2013.01); *B60W 40/101* (2013.01); *B60W 40/114* (2013.01); *B60W 2040/0881* (2013.01); *B60W 2520/14* (2013.01); *B60W 2520/20* (2013.01); *B60W 2554/40* (2020.02); *B60W 2554/80* (2020.02); *B60W 2556/10* (2020.02)

(58) Field of Classification Search
    CPC ............. B60W 40/101; B60W 40/114; B60W 2040/0881; B60W 2520/14; B60W 2520/20; B60W 2554/40; B60W 2554/80; B60W 2556/10; B60W 2520/125; B60W 2540/227; B60W 30/085; B60W 30/095; B60W 30/0953; B60W 10/184
See application file for complete search history.

(56) References Cited

U.S. PATENT DOCUMENTS

| | | | | |
|---|---|---|---|---|
| 10,829,128 | B2* | 11/2020 | Hoshikawa | ........... B60W 30/09 |
| 2008/0191546 | A1* | 8/2008 | Plantamura | ............... B60T 7/12 303/28 |
| 2014/0324286 | A1* | 10/2014 | Tsuchida | ............... B60W 30/09 701/36 |
| 2017/0291602 | A1* | 10/2017 | Newman | ............... B60W 10/04 |
| 2018/0075309 | A1* | 3/2018 | Sathyanarayana | ... G05D 1/0088 |
| 2019/0143964 | A1 | 5/2019 | Zuckerman et al. | |
| 2019/0286153 | A1 | 9/2019 | Rankawat et al. | |
| 2021/0061267 | A1* | 3/2021 | Schlender | ......... B60W 30/0956 |
| 2021/0061272 | A1* | 3/2021 | Kawanai | ............... B60W 30/09 |
| 2021/0110484 | A1* | 4/2021 | Shalev-Shwartz | ... G05D 1/0088 |
| 2022/0055613 | A1 | 2/2022 | Kavadia et al. | |
| 2022/0144264 | A1 | 5/2022 | Weiss et al. | |
| 2022/0212658 | A1* | 7/2022 | Nagata | ................. G06V 40/172 |

FOREIGN PATENT DOCUMENTS

| | | | | |
|---|---|---|---|---|
| CN | 113291251 | A | 8/2021 | |
| DE | 10329567 | A1 | 2/2005 | |
| DE | 102008005310 | A1 * | 7/2009 | .......... B60T 8/17558 |
| DE | 102011113098 | A1 * | 3/2013 | ............. B60T 7/042 |
| DE | 102012022150 | A1 | 5/2014 | |
| DE | 102017202537 | A1 | 8/2018 | |
| EP | 0903714 | A2 | 3/1999 | |
| JP | 2015205640 | A | 11/2015 | |
| JP | 2017136960 | A | 8/2017 | |
| JP | 2019064336 | A | 4/2019 | |
| JP | 2019119216 | A | 7/2019 | |
| WO | 2017056373 | A1 | 4/2017 | |
| WO | 2019152888 | A1 | 8/2019 | |

OTHER PUBLICATIONS

Farmer et al., "Integrated Segmentation and Classification for Automotive Airbag Suppression," Proceedings 2003 International Conference on Image Processing (Cat. No.03CH37429), Barcelona, Spain, 2003, pp. III-1053.

Katzourakis et al., "Road-Departure Prevention in an Emergency Obstacle Avoidance Situation," IEEE Transaction on Systems, Man, and Cybernetics: Systems, vol. 44, No. 5, May 2014, pp. 621-629.

Extended European search report mailed Jul. 3, 2024, 8 pages.

Communication under Rule 71(3) EPC, mailed on Jul. 4, 2025, 49 pages.

Japanese Office Action and translation, mailed on Jul. 29, 2025, 7 pages.

* cited by examiner

MITIGATING AN EFFECT OF A COLLISION BETWEEN A VEHICLE AND AN OBSTACLE

TECHNICAL FIELD

The disclosed technologies are directed to mitigating an effect of a collision between a vehicle and an obstacle.

BACKGROUND

An advanced driver-assistance system (ADAS) can be used to enhance an operation of a vehicle in order to reduce a likelihood of a collision. An ADAS can receive data about an environment of the vehicle, for example, from lidar devices, radar devices, image processing systems, computer vision systems, in-car networking systems, or the like. An ADAS can be configured to receive such data, prioritize information derived from the data, and act in real-time to control vehicle systems of the vehicle to reduce the likelihood of the collision. An ADAS can include, for example, an electronic stability control system, an anti-lock brakes system, an autonomous emergency braking (AEB) system, a lane departure warning system, a lane keeping assist system, an adaptive cruise control system, a collision avoidance system, a traction control system, or the like.

SUMMARY

In an embodiment, a system for mitigating an effect of a collision between a vehicle and an obstacle can include a processor and a memory. The memory can store a seat occupancy determination module and a set of modules. The set of modules can include a candidate response determination module, a candidate response evaluation module, and a controller module. The seat occupancy determination module can include instructions that, when executed by the processor, cause the processor to determine a state of a seat with respect to being occupied by a living being, the seat being on a first side opposite of a second side at which an operator is located. The set of modules can include instructions that, when executed by the processor, cause, in response to the state being: (1) occupied, a first set of operations to be implemented and (2) unoccupied, a second set of operations to be implemented. Each of the first set and the second set can be different from a current trajectory of the vehicle and can mitigate the effect of the collision between the vehicle and the obstacle.

In another embodiment, a method for mitigating an effect of a collision between a vehicle and an obstacle. The method can include determining, by a processor, a state of a seat with respect to being occupied by a living being, the seat being on a first side opposite of a second side at which an operator is located. The method can include causing, by the processor, in response to the state being: (1) occupied, a first set of operations to be implemented and (2) unoccupied, a second set of operations to be implemented. Each of the first set and the second set can be different from a current trajectory of the vehicle and can mitigate the effect of the collision between the vehicle and the obstacle.

In another embodiment, a non-transitory computer-readable medium for mitigating an effect of a collision between a vehicle and an obstacle can include instructions that, when executed by one or more processors, cause the one or more processors to determine a state of a seat with respect to being occupied by a living being, the seat being on a first side opposite of a second side at which an operator is located. The non-transitory computer-readable medium can include instructions that, when executed by one or more processors, cause, in response to the state being: (1) occupied, a first set of operations to be implemented and (2) unoccupied, a second set of operations to be implemented. Each of the first set and the second set can be different from a current trajectory of the vehicle and can mitigate the effect of the collision between the vehicle and the obstacle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to mitigating an effect of a collision between a vehicle and an obstacle. A limitation on an ability to avoid the collision can be determined. For example, a stopping distance of the vehicle can be determined to be greater than a distance between the vehicle and the obstacle. If the obstacle is moving, then the stopping distance can be determined based on an estimation of a movement of the obstacle. Additionally or alternatively, for example, a limitation on an ability to steer the vehicle in a manner to avoid the collision without causing another collision can be determined. For example, the other collision can be between the vehicle and another obstacle. To mitigate the effect of the collision, a first candidate response for the vehicle can be determined and a second candidate response for the vehicle can be determined. Each of the first candidate response and the second candidate response can be different from a current trajectory of the vehicle. For example: (1) the first candidate response can include one of a first set of operations and a second set of operations, (2) the second candidate response can include one of the first set of operations and the second set of operations, and (3) the second candidate response can be different from the first candidate response. For example, the first set of operations can include an operation of an emergency brake of the vehicle. For example, the second set of operations can include one or more of an operation of a primary brake of the vehicle or an operation of a steering mechanism of the vehicle to cause the vehicle to make a turn. For example, the second set of operations can include both the operation of the primary brake of the vehicle and the operation of the steering mechanism of the vehicle to cause the vehicle to make the turn. The first candidate response can be determined to better mitigate the effect of the collision. For example, a state of a seat of the vehicle with respect to being occupied by a living being can be determined. The seat can be disposed on a first side (e.g., a right side) of the vehicle. The first side can be opposite of a second side (e.g., a left side) of the vehicle. The second side can be a side at which an operator of the vehicle is located. In response to a determination that the state of the seat is occupied, the first candidate response can include the first set of operations. In response to a determination that the state of the seat is unoccupied, the first candidate response can include the second set of operations and a direction of the turn can be so that the collision occurs on the first side (e.g., the right side). The first candidate response can be caused to be implemented.

Figure 1:
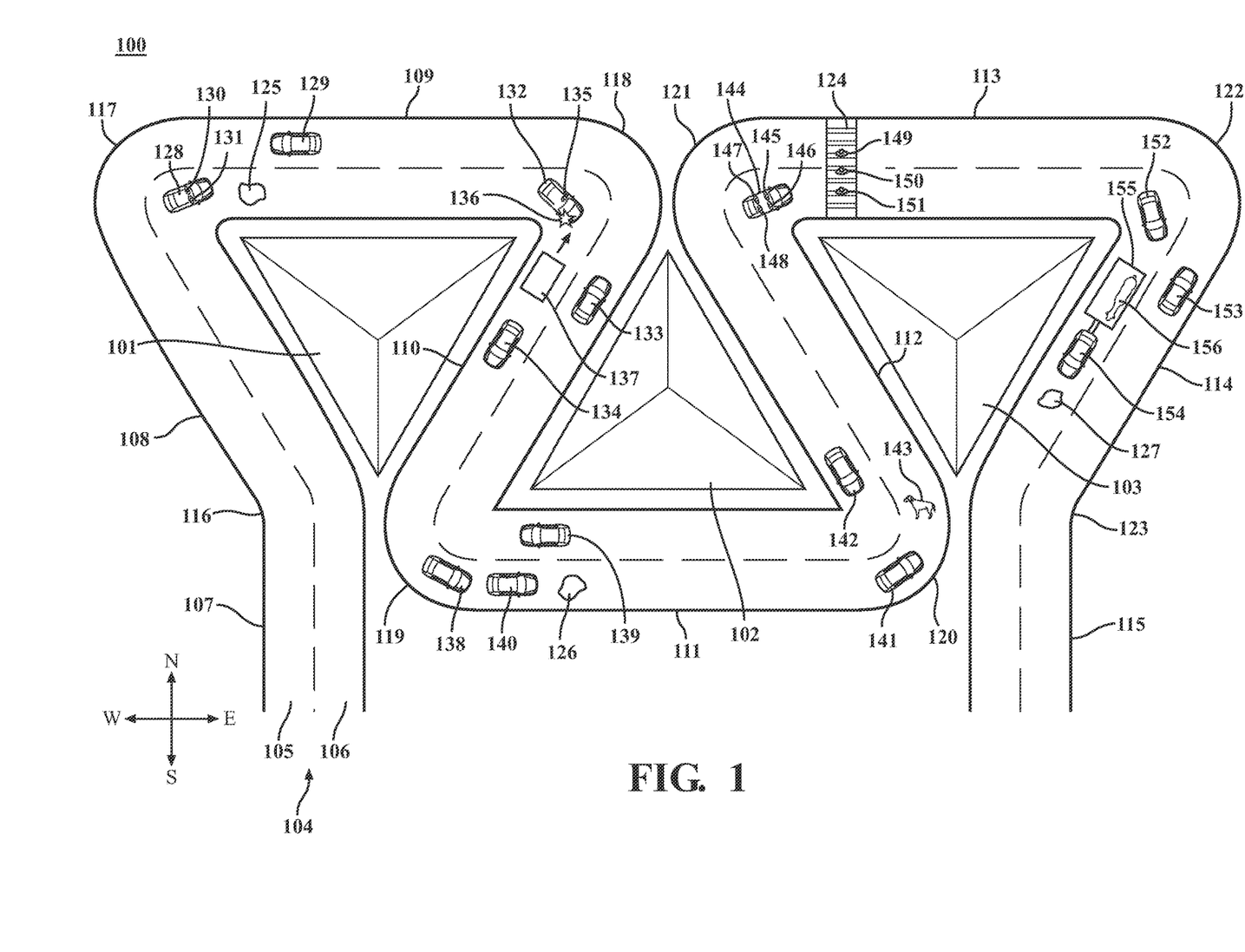
FIG. 1 includes a diagram that illustrates an example of an environment for mitigating an effect of a collision between a vehicle and an obstacle, according to the disclosed technologies.

FIG. 1 includes a diagram that illustrates an example of an environment 100 for mitigating an effect of a collision between a vehicle and an obstacle, according to the disclosed technologies. For example, the environment 100 can include, from west to east, a first mountain 101, a second mountain 102, and a third mountain 103. For example, a road 104 can wind through the first mountain 101, the second mountain 102, and the third mountain 103. The road 104 can include, for example, a lane 105 for traffic in a first direction and a lane 106 for traffic in a second direction. The road 104 can include, for example, a first segment 107, a second segment 108, a third segment 109, a fourth segment 110, a fifth segment 111, a sixth segment 112, a seventh segment 113, an eighth segment 114, and a ninth segment 115. For example, the first segment 107 can be located south of the first mountain 101 along a north to south line, the second segment 108 can be located next to the first mountain 101 along a northwest to southeast line, the third segment 109 can be located next to the first mountain 101 along a west to east line, the fourth segment 110 can be located between the first mountain 101 and the second mountain 102 along a northeast to southwest line, the fifth segment 111 can be located next to the second mountain 102 along a west to east line, the sixth segment 112 can be located between the second mountain 102 and the third mountain 103 along a northwest to southeast line, the seventh segment 113 can be located next to the third mountain 103 along a west to east line, the eighth segment 114 can be located next to the third mountain 103 along a northeast to southwest line, and the ninth segment 115 can be located south of the third mountain 103 along a north to south line. For example, a first bend 116 can connect the first segment 107 to the second segment 108, a second bend 117 can connect the second segment 108 to the third segment 109, a third bend 118 can connect the third segment 109 to the fourth segment 110, a fourth bend 119 can connect the fourth segment 110 to the fifth segment 111, a fifth bend 120 can connect the fifth segment 111 to the sixth segment 112, a sixth bend 121 can connect the sixth segment 112 to the seventh segment 113, a seventh bend 122 can connect the seventh segment 113 to the eighth segment 114, and an eighth bend 123 can connect the eighth segment 114 to the ninth segment 115.

For example, the environment 100 can include a crosswalk 124 across the seventh segment 113 just east of the sixth bend 121. For example, the environment 100 can include a first boulder 125 in the third segment 109 in the lane 106 just east of the second bend 117, a second boulder 126 in the fifth segment 111 in the lane 106 just east of the fourth bend 119, and a third boulder 127 in the eighth segment 114 in the lane 106. For example, the environment 100 can include a first vehicle 128 in the lane 106 at the second bend 117, and a second vehicle 129 in the third segment 109 in the lane 105 just ahead of the first vehicle 128. For example, the first vehicle 128 can have an operator 130 and a passenger 131. For example, the passenger 131 can occupy the front, right passenger seat. For example, the environment 100 can include a third vehicle 132 in the lane 106 at the third bend 118, a fourth vehicle 133 in the fourth segment 110 in the lane 105 just ahead of the third vehicle 132, and a fifth vehicle 134 in the fourth segment 110 in the lane 106. For example, the third vehicle 132 can have an operator 135, but no passengers. For example, the third vehicle 132 can have existing damage 136 to a front, right fender. For example, the fifth vehicle 134 can have been towing a trailer 137, which became disconnected from the fifth vehicle 134 and which is moving in a direction toward the third vehicle 132. For example, the environment 100 can include a sixth vehicle 138 in the lane 106 at the fourth bend 119, a seventh vehicle 139 in the fifth segment 111 in the lane 105 just ahead of the sixth vehicle 138, and an eighth vehicle 140 in the fifth segment 111 in the lane 106 just behind the second boulder 126. For example, the eighth vehicle 140 can be an expensive sports car. For example, the environment 100 can include a ninth vehicle 141 in the lane 106 at the fifth bend 120 and a tenth vehicle 142 in the sixth segment 112 in the lane 105 just ahead of the ninth vehicle 141. For example, a dog 143 can be in sixth segment 112 in the lane 106 just ahead of the ninth vehicle 141. For example, the environment 100 can include an eleventh vehicle 144 in the lane 106 at the sixth bend 121. For example, the eleventh vehicle 144 can have an operator 145, a first passenger 146, a second passenger 147, and a third passenger 148. For example, within the crosswalk 124 there can be a first person 149, a second person 150, and a third person 151. For example, the environment 100 can include a twelfth vehicle 152 in the lane 106 at the seventh bend 122, a thirteenth vehicle 153 in the eighth segment 114 in the lane 105 just ahead of the twelfth vehicle 152, and a fourteenth vehicle 154 in the eighth segment 114 in the lane 106 just behind the third boulder 127. For example, the fourteenth vehicle 154 can be towing a horse trailer 155 capable of carrying two horses, but carrying just one horse 156 on a left side of the horse trailer 155.

Figure 2:
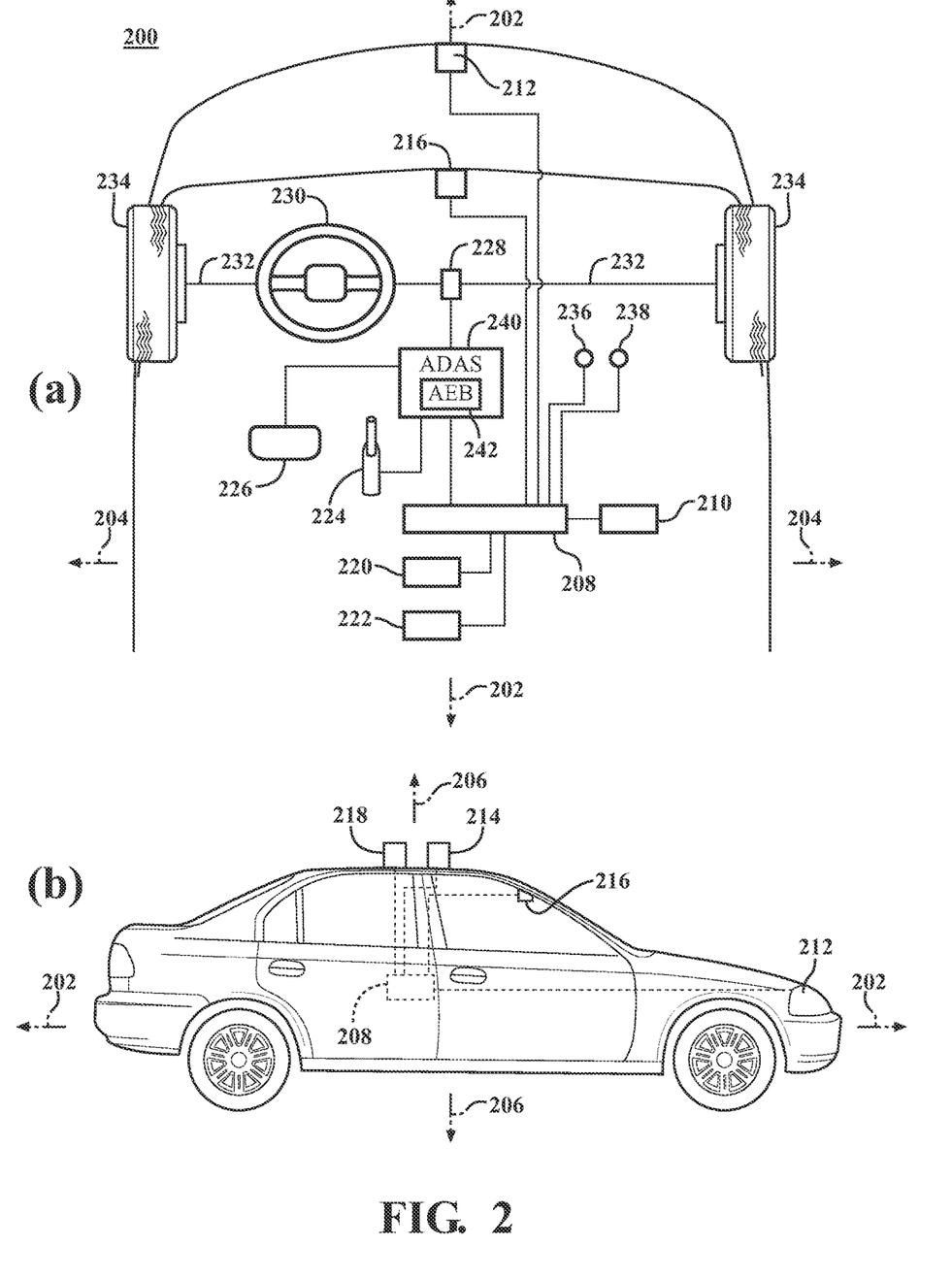
FIG. 2 includes a diagram that illustrates an example of a vehicle which can be configured to mitigate an effect of a collision between the vehicle and an obstacle, according to the disclosed technologies.

FIG. 2 includes a diagram that illustrates an example of a vehicle 200 which can be configured to mitigate an effect of a collision between the vehicle 200 and an obstacle, according to the disclosed technologies. A view (a) of FIG. 2 is a diagram of the vehicle 200 from a perspective of a plane defined by a longitudinal axis 202 of the vehicle 200 and a lateral axis 204 of the vehicle 200. A view (b) of FIG. 2 is a diagram of the vehicle 200 from a perspective of a plane defined by the longitudinal axis 202 of the vehicle 200 and a vertical axis 206 of the vehicle 200. The vehicle 200 can include, for example, a processor 208 and a memory 210.

Additionally, for example, the vehicle 200 can further include one or more of a radar device 212 or a lidar device 214. The one or more of the radar device 212 or the lidar device 214 can be communicably connected to the processor 208.

Additionally, for example, the vehicle 200 can further include a forward-facing camera 216. The forward-facing camera 216 can be communicably connected to the processor 208.

Additionally, for example, the vehicle 200 can further include a communications device 218. The communications device 218 can be communicably connected to the processor 208.

Additionally, for example, the vehicle 200 can further include an accelerometer 220 and a gyroscope 222. For example, the accelerometer 220 and the gyroscope 222 can be communicably connected to the processor 208.

Additionally, for example, the vehicle 200 can further include an emergency brake operator interface 224, a primary brake operator interface 226, and a steering mechanism 228. The steering mechanism 228 can be connected between a steering operator interface 230 and one or more axles 232 to which one or more wheels 234 are connected.

Additionally, for example, the vehicle 200 can further include one or more of an in-cabin camera 236 or a microphone 238. The one or more of the in-cabin camera 236 or the microphone 238 can be communicably connected to the processor 208.

Additionally, for example, the vehicle 200 can further include an advanced driver-assistance system (ADAS) 240. The advanced driver-assistance system (ADAS) 240 can be communicably connected to the processor 208, the emergency brake operator interface 224, the primary brake operator interface 226, and the steering mechanism 228. The advanced driver-assistance system (ADAS) 240 can be configured to control, in response to a determination that a probability of a collision between the vehicle 200 and an obstacle is greater than a threshold, one or more of the emergency brake operator interface 224, the primary brake operator interface 226, or the steering mechanism 228 to implement a response to avoid the collision or to mitigate an effect of the collision. For example, the advanced driver-assistance system (ADAS) 240 can include an autonomous emergency braking (AEB) system 242.

Figure 3:
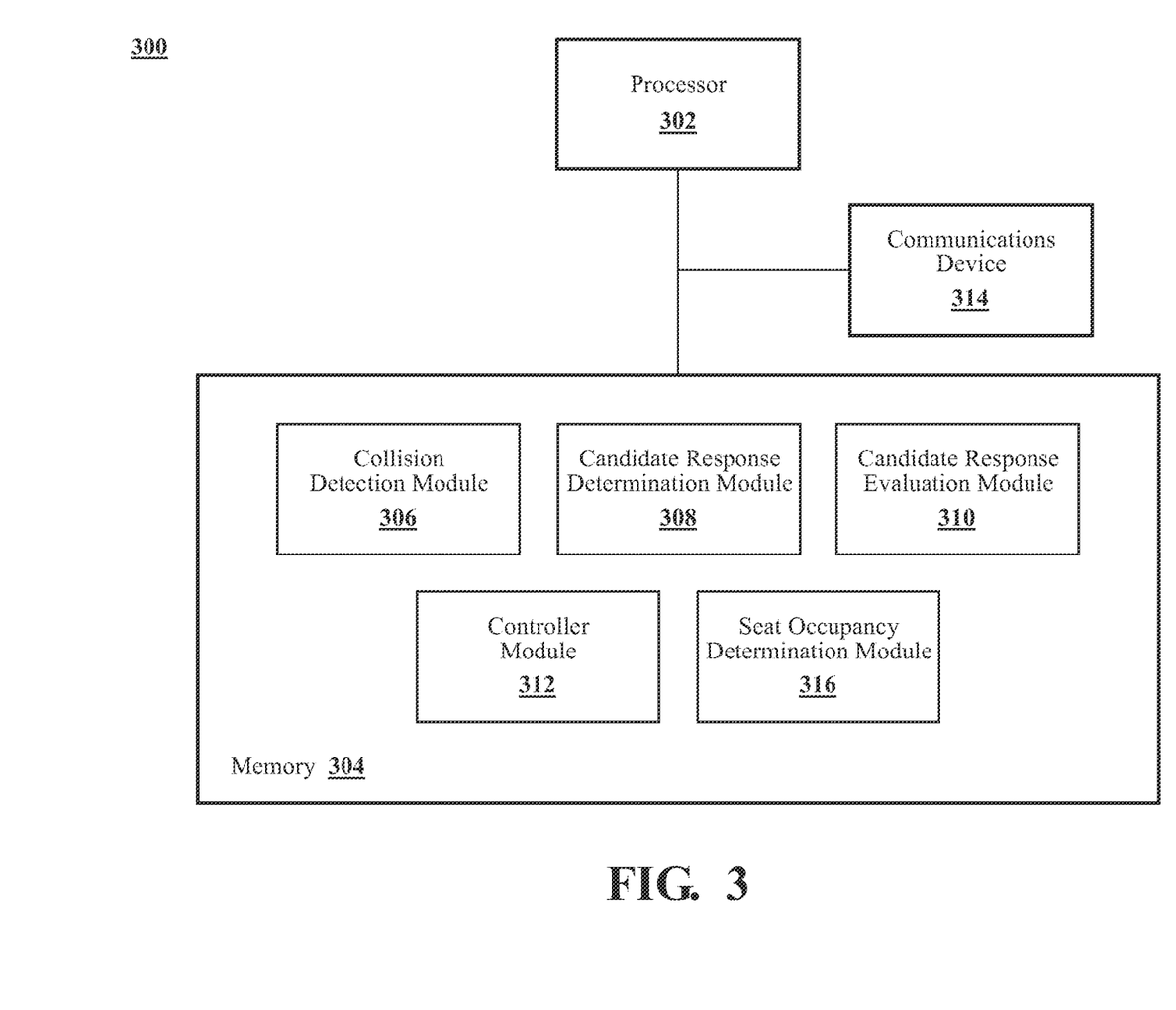
FIG. 3 includes a block diagram that illustrates an example of a system for mitigating an effect of a collision between a vehicle and an obstacle, according to the disclosed technologies.

FIG. 3 includes a block diagram that illustrates an example of a system 300 for mitigating an effect of a collision between a vehicle and an obstacle, according to the disclosed technologies. The system 300 can include, for example, a processor 302 and a memory 304. The memory 304 can be communicably connected to the processor 302. For example, the memory 304 can store a collision detection module 306, a candidate response determination module 308, a candidate response evaluation module 310, and a controller module 312.

For example, the collision detection module 306 can include instructions that function to control the processor 302 to determine a limitation on an ability to avoid the collision.

For example, the instructions to determine the limitation on the ability to avoid the collision between the vehicle and the obstacle can include instructions to determine that a stopping distance of the vehicle is greater than a distance between the vehicle and the obstacle. That is, the vehicle cannot stop within a distance that is less than the distance between the vehicle and the obstacle. With reference to FIGS. 1 and 2, for example, the vehicle can be the first vehicle 128 (e.g., the vehicle 200). For example, one or more of the radar device 212 or the lidar device 214 can be used to determine that the stopping distance of the first vehicle 128 is greater than the distance between the first vehicle 128 and the first boulder 125.

Additionally, for example, the obstacle can be moving and the instructions to determine the stopping distance can include instructions to determine, based on an estimation of a movement of the obstacle, the stopping distance. With reference to FIGS. 1 and 2, for example, the vehicle can be the third vehicle 132 (e.g., the vehicle 200). For example, one or more of the radar device 212 or the lidar device 214 can be used to determine, based on an estimation of the movement of trailer 137, that the stopping distance of the third vehicle 132 is greater than the distance between the third vehicle 132 and the trailer 137.

Additionally or alternatively, for example, the instructions to determine the limitation on the ability to avoid the collision between the vehicle and the obstacle can include instructions to determine a limitation on an ability to steer the vehicle in a manner to avoid the collision without causing another collision. The other collision can be between the vehicle and another obstacle. With reference to FIGS. 1 and 2, for example, the vehicle can be the third vehicle 132 (e.g., the vehicle 200). For example, using information from the forward-facing camera 216, a limitation on an ability to steer the third vehicle 132 in a manner to avoid the collision with the trailer 137 can be determined because steering the third vehicle 132 in such a manner can cause another collision with the fourth vehicle 133 or with the first mountain 101.

Returning to FIG. 3, for example, the candidate response determination module 308 can include instructions that function to control the processor 302 to determine, to mitigate the effect of the collision, a first candidate response for the vehicle and a second candidate response for the vehicle. Each of the first candidate response and the second candidate response can be different from a current trajectory of the vehicle.

For example, the candidate response evaluation module 310 can include instructions that function to control the processor 302 to determine that the first candidate response better mitigates the effect of the collision.

For example, the instructions to determine the first candidate response and the second candidate response can include instructions to determine a first probability and a second probability. The first probability can be that the first candidate response will cause a force produced by a tire of the vehicle to be greater than a saturation force of the tire. The second probability can be that the second candidate response will cause the force produced by the tire of the vehicle to be greater than the saturation force of the tire. That is, if a value of the force produced by the tire of the vehicle is greater than the saturation force of the tire, then a relationship that exists between the tire and a surface in contact with the tire can be characterized as a skid. The instructions to determine that the first candidate response better mitigates the effect of the collision can include instructions to determine, based on the first probability and the second probability, that the first candidate response better mitigates the effect of the collision.

For example, the instructions to determine the first probability can include instructions to determine, from first historic proxy information, the first probability, and the instructions to determine the second probability can include instructions to determine, from second historic proxy information. The first historic proxy information can be about initiating the first candidate response from a trajectory similar to the current trajectory, and the second historic proxy information can be about initiating the second candidate response from the trajectory similar to the current trajectory.

For example, the system 300 can further include a communications device 314. The communications device 314 can be communicably connected to the processor 302. The communications device 314 can be configured to receive, before executing the instructions to determine the first candidate response and the second candidate response, the first historic proxy information and the second historic proxy information. With reference to FIG. 2, for example, the communications device 314 can be the communications device 218.

Additionally or alternatively, for example, the first historic proxy information can include first historic sensor information obtained from the vehicle and the second historic proxy information can include second historic sensor information obtained from the vehicle. The first historic sensor information can include one or more of a measure of a sideslip of the tire or a measure of a yaw rate of the vehicle. The second historic sensor information can include the one or more of the measure of the sideslip of the tire or the measure of the yaw rate of the vehicle.

For example, the measure of the sideslip can be estimated from a signal from an accelerometer disposed on the vehicle and from a signal from a gyroscope disposed on the vehicle. For example, the measure of the yaw rate can be estimated from the signal from the gyroscope. With reference to FIG. 2, for example, the accelerometer can be the accelerometer 220 and the gyroscope can be the gyroscope 222.

Returning to FIG. 3, for example: (1) the first candidate response can include one of a first set of operations and a second set of operations, (2) the second candidate response can include one of the first set of operations and the second set of operations, and (3) the second candidate response can be different from the first candidate response.

For example, the first set of operations can include an operation of an emergency brake of the vehicle. For example, the second set of operations can include one or more of an operation of a primary brake of the vehicle or an operation of a steering mechanism of the vehicle to cause the vehicle to make a turn. For example, the second set of operations can include both the operation of the primary brake of the vehicle and the operation of the steering mechanism of the vehicle to cause the vehicle to make the turn. With reference to FIG. 2, for example, the operation of the emergency brake can be via the emergency brake operator interface 224, the operation of the primary brake can be via the primary brake operator interface 226, and the operation of the steering mechanism can be via the steering mechanism 228.

Returning to FIG. 3, additionally, for example, the memory 304 can further store a seat occupancy determination module 316. The seat occupancy determination module 316 can include instructions that function to control the processor 302 to determine a state of a seat of the vehicle with respect to being occupied by a living being. The seat can be disposed on a first side (e.g., a right side) of the vehicle. The first side can be opposite of a second side (e.g., a left side of the vehicle. The second side can be a side at which an operator of the vehicle is located. In response to a determination that the state of the seat is occupied, the first candidate response can include the first set of operations. In response to a determination that the state of the seat is unoccupied, the first candidate response can include the second set of operations and a direction of the turn can be so that the collision occurs on the first side (e.g., the right side).

With reference to FIGS. 1 and 2, for example, the vehicle can be the vehicle 200. For example, one or more of the in-cabin camera 236 or the microphone 238 can be used to determine the state of a seat of the vehicle 200 with respect to being occupied by a living being. For example, the vehicle can be the first vehicle 128 (e.g., the vehicle 200). Because the first vehicle 128 has the operator 130 and the passenger 131 with the passenger 131 occupying the front, right passenger seat, the first candidate response of the first vehicle 128 can be the first set of operations, the operation of the emergency brake via the emergency brake operator interface 224. Alternatively, the vehicle can be the third vehicle 132 (e.g., the vehicle 200). Because the third vehicle 132 has the operator 135, but no passengers, the first candidate response of the third vehicle 132 can be the second set of operations, one or more of the operation of the primary brake via the primary brake operator interface 226 or the operation of the steering mechanism 228 to cause the third vehicle 132 to make a turn to the left so that the collision occurs on the right side. The second set of operations can better mitigate the collision because the second set of operations can better reduce a probability that the collision will cause an injury to the operator 135 or a severity of such an injury.

For example, the instructions to determine that the first candidate response better mitigates the effect of the collision can include instructions to determine that one or more of: (1) a severity of an injury to one or more living beings associated with the first candidate response or (2) a value of economic damage, to one or more of the vehicle or the obstacle, associated with the first candidate response is less than one or more of: (1) a severity of an injury to one or more living beings associated with the second candidate response or (2) a value of economic damage, to one or more of the vehicle or the obstacle, associated with the second candidate response.

With reference to FIGS. 1 and 2, for example, the vehicle can be the sixth vehicle 138 (e.g., the vehicle 200). For example, using information from the forward-facing camera 216, the sixth vehicle 138 can determine that a collision with the eighth vehicle 140 (e.g., the expensive sports car) can result in a high value of economic damage. The sixth vehicle 138 can determine that the first candidate response better mitigates the effect of the collision because the value of economic damage to the sixth vehicle 138, associated with the first candidate response, is less than the value of economic damage to the sixth vehicle 138 associated with the second candidate response.

For example, the one or more living beings associated with the first candidate response can be the obstacle. With reference to FIGS. 1 and 2, for example, the vehicle can be the ninth vehicle 141 (e.g., the vehicle 200). For example, using information from the forward-facing camera 216, the ninth vehicle 141 can determine that a collision with the dog 143 can result in an injury to the dog 143. The ninth vehicle 141 can determine that the first candidate response better mitigates the effect of the collision because the severity of the injury to the dog 143, associated with the first candidate response, is less than the severity of the injury to the dog 143 associated with the second candidate response.

Returning to FIG. 3, for example, the one or more living beings associated with the first candidate response can include a first set of one or more living beings and a second set of one or more living beings. The first set of the one or more living beings can be the obstacle. The second set of the one or more living beings can be within the vehicle. The candidate response determination module 308 can further include instructions to determine a first count and a second count. The first count can be of the first set of the one or more living beings. The second count can be of the second set of the one or more living beings. The instructions to determine that the first candidate response better mitigates the effect of the collision can include instructions to determine, based on the first count and the second count, that the first candidate response better mitigates the effect of the collision.

With reference to FIGS. 1 and 2, for example, the vehicle can be the eleventh vehicle 144 (e.g., the vehicle 200). For example, using information from the forward-facing camera 216, the eleventh vehicle 144 can determine the first count is three (i.e., the first person 149, the second person 150, and the third person 151). For example, using information from the one or more of the in-cabin camera 236 or the microphone 238, the eleventh vehicle 144 can determine the second count is four (e.g., the operator 145, the first passenger 146, the second passenger 147, and the third passenger 148). The eleventh vehicle 144 can determine, based on the first count and the second count, that the first candidate response better mitigates the effect of the collision.

Returning to FIG. 3, for example, the candidate response determination module 308 can further include instructions to obtain information about a first side of the vehicle that indicates that an economic value of the first side is less than an economic value of a second side of the vehicle. In response to a determination that the economic value of the first side of the vehicle is less than the economic value of the second side of the vehicle, the first candidate response can include an operation of a steering mechanism of the vehicle to cause the vehicle to make a turn. A direction of the turn can be so that the collision occurs on the first side of the vehicle.

With reference to FIGS. 1 and 2, for example, the vehicle can be the third vehicle 132 (e.g., the vehicle 200). For example, because the third vehicle 132 has the existing damage 136 to the front, right fender, the third vehicle 132 can obtain information about the right side of the third vehicle 132 that indicates that the economic value of the right side of the third vehicle 132 is less than the economic value of the left side of the third vehicle 132. In response to a determination that the economic value of the right side of the third vehicle 132 is less than the economic value of the left side of the third vehicle 132, the first candidate response can include an operation of the steering mechanism 228 of the third vehicle 132 to cause the third vehicle 132 to make a turn. A direction of the turn can be so that the collision occurs on the right side of the third vehicle 132, which can mitigate the effect of the collision because the value of economic damage to the third vehicle 132 is less than the value of economic damage otherwise would be because of the existing damage 136 to the front, right fender of the third vehicle 132.

Returning to FIG. 3, for example, the candidate response determination module 308 can further include instructions to obtain information about a first side of the obstacle that indicates that an economic value of the first side of the obstacle is less than an economic value of a second side of the obstacle. In response to a determination that the economic value of the first side of the obstacle is less than the economic value of the second side of the obstacle, the first candidate response can include an operation of a steering mechanism of the vehicle to cause the vehicle to make a turn. A direction of the turn can be so that the collision occurs on the first side of the obstacle.

With reference to FIGS. 1 and 2, for example, the vehicle can be the twelfth vehicle 152 (e.g., the vehicle 200). For example, using information from the forward-facing camera 216, the twelfth vehicle 152 can obtain information about the right side of the horse trailer 155 (i.e., an absence of a horse) that indicates that the economic value of the right side of the horse trailer 155 is less than the economic value of the left side of the horse trailer 155 (i.e., at which the horse 156 is being carried). In response to a determination that the economic value of the right side of the horse trailer 155 is less than the economic value of the left side of the horse trailer 155, the first candidate response can include an operation of the steering mechanism 228 of the twelfth vehicle 152 to cause the twelfth vehicle 152 to make a turn. A direction of the turn can be so that the collision occurs on the right side of the horse trailer 155, which can mitigate the effect of the collision because the value of economic damage to the horse trailer 155 and the horse 156 is less than the value of economic damage otherwise would be because of a presence of the horse on the left side of the horse trailer 155.

Returning to FIG. 3, for example, the controller module 312 can include instructions that function to control the processor 302 to cause the first candidate response to be implemented. For example, the instructions to cause the first candidate response to be implemented include instructions to cause, via an advanced driver-assistance system (ADAS), the first candidate response to be implemented. For example, the advanced driver-assistance system (ADAS) can include an autonomous emergency braking (AEB) system. With reference to FIG. 2, for example, the advanced driver-assistance system (ADAS) can be the advanced driver-assistance system (ADAS) 240 and the autonomous emergency braking (AEB) system can be the autonomous emergency braking (AEB) system 242.

Figure 4:
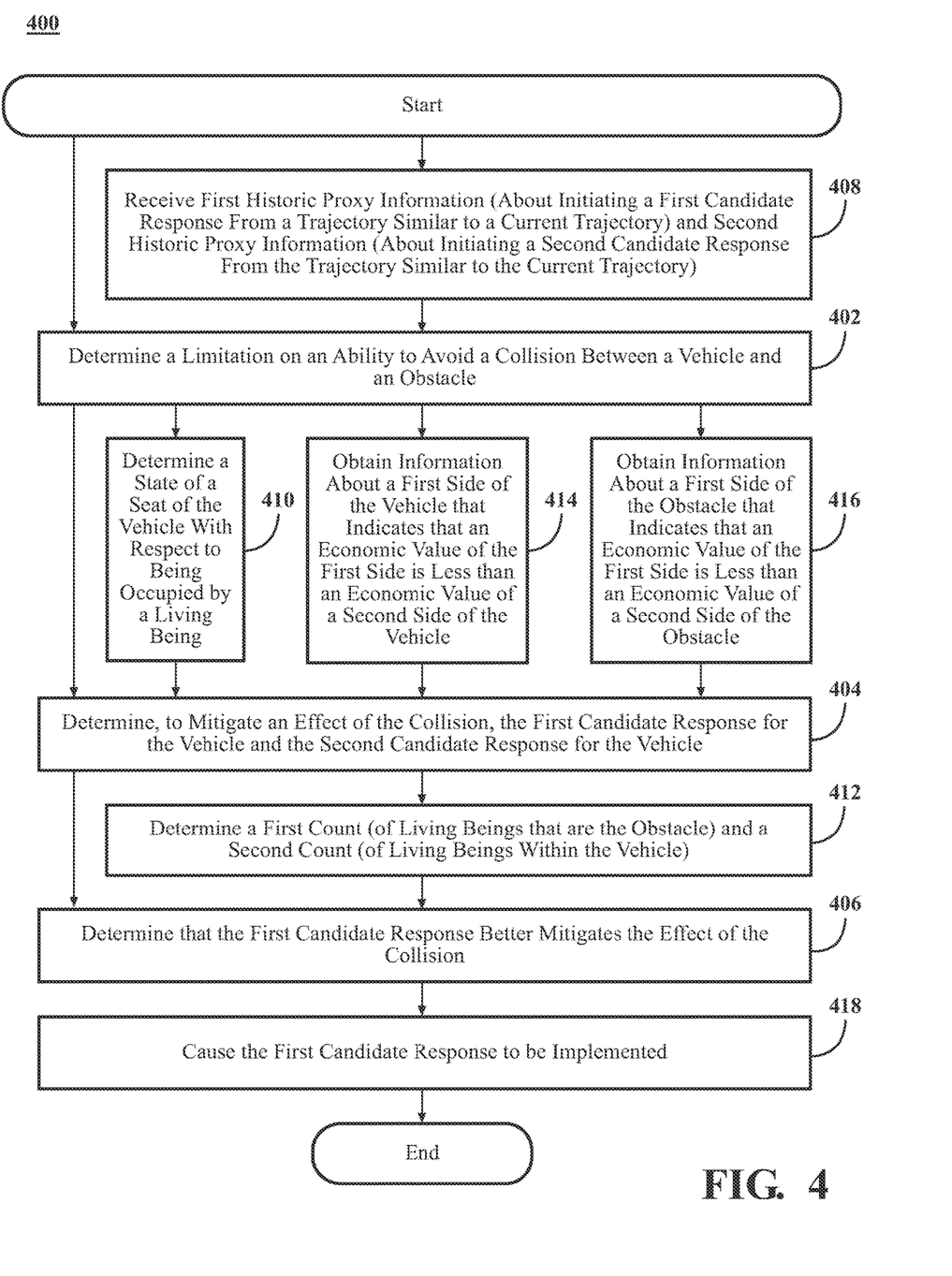
FIG. 4 includes a flow diagram that illustrates an example of a method that is associated with mitigating an effect of a collision between a vehicle and an obstacle, according to the disclosed technologies.

FIG. 4 includes a flow diagram that illustrates an example of a method 400 that is associated with mitigating an effect of a collision between a vehicle and an obstacle, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel.

In the method 400, at an operation 402, for example, the collision detection module 306 can determine a limitation on an ability to avoid the collision.

For example, the operation 402 can include determining that a stopping distance of the vehicle is greater than a distance between the vehicle and the obstacle. That is, the vehicle cannot stop within a distance that is less than the distance between the vehicle and the obstacle.

Additionally, for example, the obstacle can be moving and the operation 402 can include determining, based on an estimation of a movement of the obstacle, the stopping distance.

Additionally or alternatively, for example, the operation 402 can include determining a limitation on an ability to steer the vehicle in a manner to avoid the collision without causing another collision. The other collision can be between the vehicle and another obstacle.

At an operation 404, for example, the candidate response determination module 308 can determine, to mitigate the effect of the collision, a first candidate response for the vehicle and a second candidate response for the vehicle. Each of the first candidate response and the second candidate response can be different from a current trajectory of the vehicle.

At an operation 406, for example, the candidate response evaluation module 310 can determine that the first candidate response better mitigates the effect of the collision.

For example, the operation 404 can include determining a first probability and a second probability. The first probability can be that the first candidate response will cause a force produced by a tire of the vehicle to be greater than a saturation force of the tire. The second probability can be that the second candidate response will cause the force produced by the tire of the vehicle to be greater than the saturation force of the tire. That is, if a value of the force produced by the tire of the vehicle is greater than the saturation force of the tire, then a relationship that exists between the tire and a surface in contact with the tire can be characterized as a skid. The operation 406 can include determining, based on the first probability and the second probability, that the first candidate response better mitigates the effect of the collision.

For example, the operation 404 can include determining, from first historic proxy information, the first probability, and the instructions to determine the second probability can include instructions to determine, from second historic proxy information. The first historic proxy information can be about initiating the first candidate response from a trajectory similar to the current trajectory, and the second historic proxy information can be about initiating the second candidate response from the trajectory similar to the current trajectory.

At an operation 408, for example, the communications device 314 can receive, before the operation 404, the first historic proxy information and the second historic proxy information.

Additionally or alternatively, for example, the first historic proxy information can include first historic sensor information obtained from the vehicle and the second historic proxy information can include second historic sensor information obtained from the vehicle. The first historic sensor information can include one or more of a measure of a sideslip of the tire or a measure of a yaw rate of the vehicle. The second historic sensor information can include the one or more of the measure of the sideslip of the tire or the measure of the yaw rate of the vehicle.

For example, the measure of the sideslip can be estimated from a signal from an accelerometer disposed on the vehicle and from a signal from a gyroscope disposed on the vehicle. For example, the measure of the yaw rate can be estimated from the signal from the gyroscope.

For example: (1) the first candidate response can include one of a first set of operations and a second set of operations, (2) the second candidate response can include one of the first set of operations and the second set of operations, and (3) the second candidate response can be different from the first candidate response.

For example, the first set of operations can include an operation of an emergency brake of the vehicle. For example, the second set of operations can include one or more of an operation of a primary brake of the vehicle or an operation of a steering mechanism of the vehicle to cause the vehicle to make a turn.

At an operation 410, for example, the seat occupancy determination module 316 can determine a state of a seat of the vehicle with respect to being occupied by a living being. The seat can be disposed on a first side (e.g., a right side) of the vehicle. The first side can be opposite of a second side (e.g., a left side) of the vehicle. The second side can be a side at which an operator of the vehicle is located. In response to a determination that the state of the seat is occupied, the first candidate response can include the first set of operations. In response to a determination that the state of the seat is unoccupied, the first candidate response can include the second set of operations and a direction of the turn can be so that the collision occurs on the first side (e.g., the right side).

For example, the operation 406 can include determining that one or more of: (1) a severity of an injury to one or more living beings associated with the first candidate response or (2) a value of economic damage, to one or more of the vehicle or the obstacle, associated with the first candidate response is less than one or more of: (1) a severity of an injury to one or more living beings associated with the second candidate response or (2) a value of economic damage, to one or more of the vehicle or the obstacle, associated with the second candidate response.

For example, the one or more living beings associated with the first candidate response can be the obstacle.

For example, the one or more living beings associated with the first candidate response can include a first set of one or more living beings and a second set of one or more living beings. The first set of the one or more living beings can be the obstacle. The second set of the one or more living beings can be within the vehicle. At an operation 412, for example, the candidate response determination module 308 can determine a first count and a second count. The first count can be of the first set of the one or more living beings. The second count can be of the second set of the one or more living beings. The operation 406 can include determining, based on the first count and the second count, that the first candidate response better mitigates the effect of the collision.

At an operation 414, for example, the candidate response determination module 308 can obtain information about a first side of the vehicle that indicates that an economic value of the first side is less than an economic value of a second side of the vehicle. In response to a determination that the economic value of the first side of the vehicle is less than the economic value of the second side of the vehicle, the first candidate response can include an operation of a steering mechanism of the vehicle to cause the vehicle to make a turn. A direction of the turn can be so that the collision occurs on the first side of the vehicle.

At an operation 416, for example, the candidate response determination module 308 can obtain information about a first side of the obstacle that indicates that an economic value of the first side of the obstacle is less than an economic value of a second side of the obstacle. In response to a determination that the economic value of the first side of the obstacle is less than the economic value of the second side of the obstacle, the first candidate response can include an operation of a steering mechanism of the vehicle to cause the vehicle to make a turn. A direction of the turn can be so that the collision occurs on the first side of the obstacle.

At an operation 418, for example, the controller module 312 can cause the first candidate response to be implemented. For example, the operation 418 can include causing, via an advanced driver-assistance system (ADAS), the first candidate response to be implemented. For example, the advanced driver-assistance system (ADAS) can include an autonomous emergency braking (AEB) system.

Figure 5:
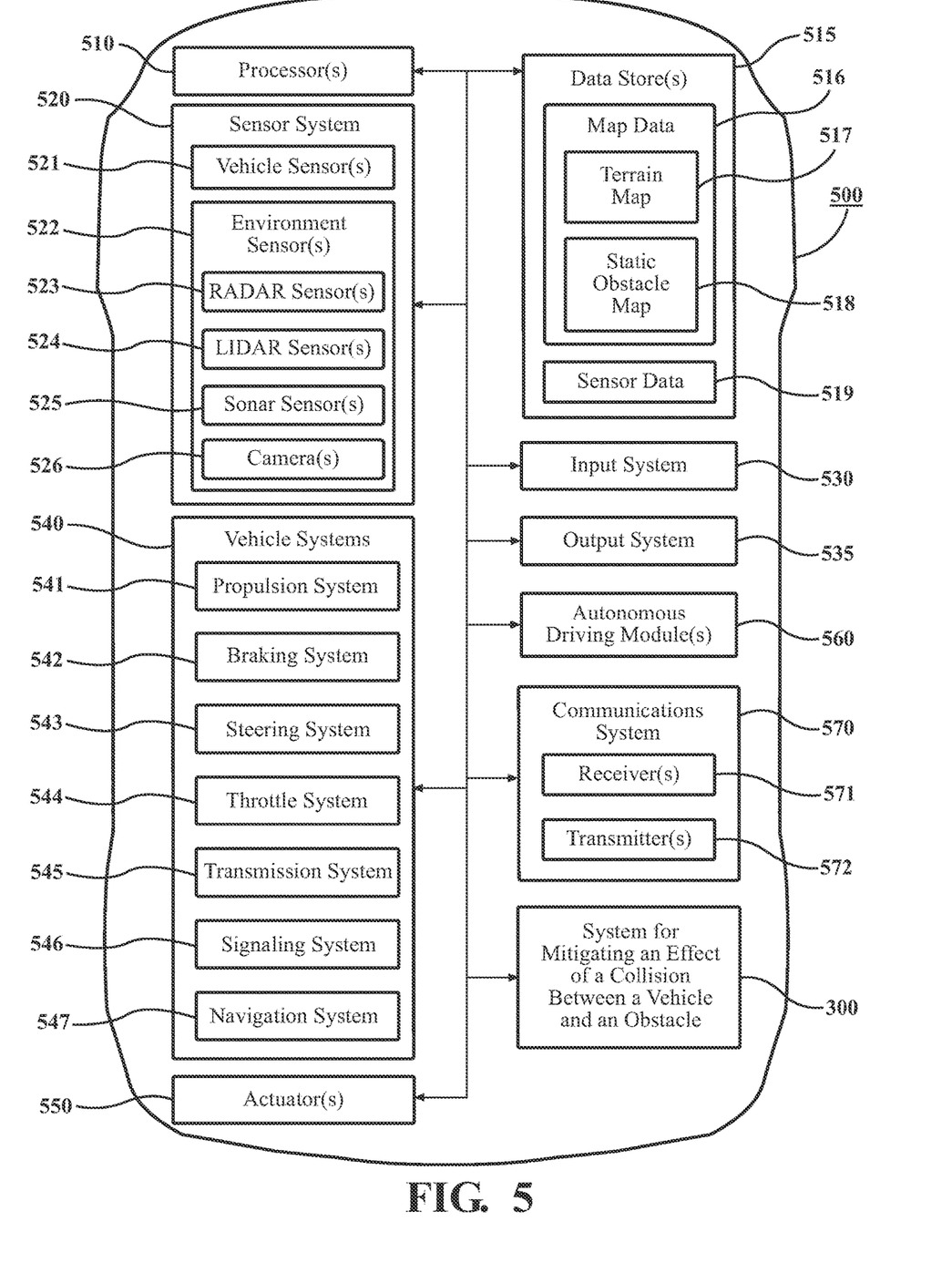
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 128 (illustrated in FIG. 1), the third vehicle 132 (illustrated in FIG. 1), the sixth vehicle 138 (illustrated in FIG. 1), the ninth vehicle 141 (illustrated in FIG. 1), the eleventh vehicle 144 (illustrated in FIG. 1), the twelfth vehicle 152 (illustrated in FIG. 1), or the vehicle 200 (illustrated in FIG. 2) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and the system 300 for mitigating an effect of a collision between a vehicle and an obstacle.

In one or more arrangements, the one or more processors 510 can be a main processor of the vehicle 500. For example, the one or more processors 510 can be an electronic control unit (ECU). For example, functions and/or operations of one or more of the processor 208 (illustrated in FIG. 2) or the processor 302 (illustrated in FIG. 3) can be realized by the one or more processors 510.

The one or more data stores 515 can store, for example, one or more types of data. The one or more data stores 515 can include volatile memory and/or non-volatile memory. For example, functions and/or operations of one or more of the memory 210 (illustrated in FIG. 2) or the memory 304 (illustrated in FIG. 3) can be realized by the one or more data stores 515. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500. For example, functions and/or operations of one or more of the accelerometer 220 (illustrated in FIG. 2), the gyroscope 222 (illustrated in FIG. 2), the in-cabin camera 236 (illustrated in FIG. 2) or the microphone 238 (illustrated in FIG. 2) can be realized by the one or more vehicle sensors 521.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of the radar device 212 (illustrated in FIG. 2) can be realized by the one or more radar sensors 523. For example, functions and/or operations of the lidar device 214 (illustrated in FIG. 2) can be realized by the one or more lidar sensors 524. For example, functions and/or operations of the forward-facing camera 216 (illustrated in FIG. 2) can be realized by the one or more cameras 526.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed. For example, functions and/or operations of one or more of the emergency brake operator interface 224 (illustrated in FIG. 2) or the primary brake operator interface 226 (illustrated in FIG. 2) can be realized by the braking system 542. For example, functions and/or operations of the steering operator interface 230 (illustrated in FIG. 2) can be realized by the steering system 543.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 218 (illustrated in FIG. 2) can be realized by the communications system 570.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
a seat occupancy determination module including instructions that, when executed by the processor, cause the processor to determine a state of a seat with respect to being occupied by a living being, the seat being on a first side opposite of a second side at which an operator is located; and
a set of modules, the set of modules including a candidate response determination module, a candidate response evaluation module, and a controller module, the set of modules including instructions that, when executed by the processor, cause:
a first set of operations to be implemented, or
a second set of operations to be implemented,
each of the first set and the second set:
being different from a current trajectory of a vehicle; and
mitigating an effect of a collision between the vehicle and an obstacle; and
a determination to be made about which of the first set or the second set better mitigates the effect of the collision and therefore implemented by determining:
the state of the seat with respect to being occupied or unoccupied,
a first probability that the first set will cause a force produced by a tire of the vehicle to be greater than a saturation force of the tire, and
a second probability that the second set will cause the force produced by the tire to be greater than the saturation force.

2. The system of claim 1, wherein:
the first set comprises an operation of an emergency brake of the vehicle, and
the second set comprises at least one of an operation of a primary brake of the vehicle or an operation of a steering mechanism of the vehicle to cause the vehicle to make a turn.

3. The system of claim 2, wherein the second set comprises both the operation of the primary brake of the vehicle and the operation of the steering mechanism of the vehicle to cause the vehicle to make the turn.

4. The system of claim 2, wherein:
the set of modules further includes instructions to obtain information about the first side of the vehicle that indicates that a severity of an injury to at least one living being within the vehicle associated with a collision on the first side of the vehicle is less than a severity of the injury to the at least one living being within the vehicle associated with a collision on the second side of the vehicle, and
a direction of the turn is to cause the collision to occur on the first side of the vehicle.

5. The system of claim 2, wherein:
the set of modules further includes instructions to obtain information about the first side of the vehicle that indicates that an economic value of the first side of the vehicle is less than an economic value of the second side of the vehicle, and
a direction of the turn is to cause the collision to occur on the first side of the vehicle.

6. The system of claim 2, wherein:
the set of modules further includes instructions to obtain information about a first side of the obstacle that indicates that an economic value of the first side of the obstacle is less than an economic value of a second side of the obstacle, and
a direction of the turn is to cause the collision to occur on the first side of the obstacle.

7. The system of claim 1, wherein the set of modules further includes instructions to determine:

the first set; and
the second set.

8. The system of claim 1, wherein:
the instructions to determine the first probability include instructions to determine, from first historic proxy information, the first probability, the first historic proxy information comprising information associated with trajectories prior to the current trajectory, and
the instructions to determine the second probability include instructions to determine, from second historic proxy information, the second probability, the second historic proxy information comprising information associated with trajectories prior to the current trajectory.

9. The system of claim 8, further comprising a communications device configured to receive, before executing the instructions to determine the first set and the second set, the first historic proxy information and the second historic proxy information.

10. The system of claim 8, wherein:
the first historic proxy information comprises first historic sensor information obtained from the vehicle, the first historic sensor information comprising at least one of a measure of a sideslip of the tire or a measure of a yaw rate of the vehicle, and
the second historic proxy information comprises second historic sensor information obtained from the vehicle, the second historic sensor information comprising the at least one of the measure of the sideslip of the tire or the measure of the yaw rate of the vehicle.

11. The system of claim 10, wherein:
the measure of the sideslip is estimated from a signal from an accelerometer disposed on the vehicle and from a signal from a gyroscope disposed on the vehicle, and
the measure of the yaw rate is estimated from the signal from the gyroscope.

12. The system of claim 1, wherein:
the instructions to cause the first set to be implemented include instructions to cause, via an advanced driver-assistance system, the first set to be implemented, and
the instructions to cause the second set to be implemented include instructions to cause, via the advanced driver-assistance system, the second set to be implemented.

13. The system of claim 4, wherein the instruction to cause the determination to be made about which of the first set or the second set better mitigates the effect of the collision include instructions to determine a first count and a second count, the first count being of the at least one living being within the vehicle associated with the collision on the first side of the vehicle, the second count being of the at least one living being within the vehicle associated with the second side of the vehicle.

14. The system of claim 12, wherein the advanced driver-assistance system includes an autonomous emergency braking system.

15. A method, comprising:
determining, by a processor, a state of a seat with respect to being occupied by a living being, the seat being on a first side opposite of a second side at which an operator is located;
causing, by the processor:
a first set of operations to be implemented, or
a second set of operations to be implemented,
each of the first set and the second set:
being different from a current trajectory of a vehicle; and
mitigating an effect of a collision between the vehicle and an obstacle; and
causing, by the processor, a determination to be made about which of the first set or the second set better mitigates the effect of the collision and is therefore implemented by determining:
the state of the seat of the vehicle with respect to being occupied or unoccupied,
a first probability that the first set will cause a force produced by a tire of the vehicle to be greater than a saturation force of the tire, and
a second probability that the second set will cause the force produced by the tire to be greater than the saturation force.

16. The method of claim 15, further comprising determining, by the processor, a limitation on an ability to avoid the collision between the vehicle and the obstacle.

17. The method of claim 16, wherein the determining the limitation on the ability to avoid the collision between the vehicle and the obstacle comprises determining that a stopping distance of the vehicle is greater than a distance between the vehicle and the obstacle.

18. The method of claim 17, wherein:
the obstacle is moving, and
the determining the stopping distance comprises determining, based on an estimation of a movement of the obstacle, the stopping distance.

19. The method of claim 16, wherein the determining the limitation on the ability to avoid the collision between the vehicle and the obstacle comprises determining a limitation on an ability to steer the vehicle in a manner to avoid the collision without causing another collision, the other collision being between the vehicle and another obstacle.

20. A non-transitory computer-readable medium for mitigating an effect of a collision between a vehicle and an obstacle, the non-transitory computer-readable medium including instructions that, when executed by one or more processors, cause the one or more processors to:
determine a state of a seat with respect to being occupied by a living being, the seat being on a first side opposite of a second side at which an operator is located; and
cause:
a first set of operations to be implemented, or
a second set of operations to be implemented,
each of the first set and the second set:
being different from a current trajectory of the vehicle; and
mitigating the effect of the collision between the vehicle and the obstacle; and
cause a determination to be made about which of the first set or the second set better mitigates the effect of the collision and is therefore implemented by determining:
the state of the seat of the vehicle with respect to being occupied or unoccupied,
a first probability that the first set will cause a force produced by a tire of the vehicle to be greater than a saturation force of the tire, and
a second probability that the second set will cause the force produced by the tire to be greater than the saturation force.

* * * * *